United States Patent

Higuchi et al.

[11] Patent Number: 5,572,342
[45] Date of Patent: Nov. 5, 1996

[54] LCD, LIGHT SOURCE, AND HEMISPHERIC CONCAVE REFLECTOR MOUNTED INDIVIDUALLY TO A SUPPORT AND PART OF A HEADS UP DISPLAY

[75] Inventors: Masahiro Higuchi, Chiryu; Hideki Okuyama, Obu; Minoru Sumiya, Nagoya, all of Japan

[73] Assignee: Nippondenso Co., Ltd., Kariya, Japan

[21] Appl. No.: 408,165

[22] Filed: Mar. 21, 1995

[30] Foreign Application Priority Data

| Mar. 30, 1994 | [JP] | Japan | 6-061764 |
| Jun. 8, 1994 | [JP] | Japan | 6-126619 |
| Jul. 29, 1994 | [JP] | Japan | 6-178778 |

[51] Int. Cl.⁶ ............ G02F 1/1335; G02F 1/1333; G02B 27/14; G03B 21/28
[52] U.S. Cl. ............ 359/49; 359/83; 359/630; 359/631; 353/98; 362/268; 362/293; 362/308; 362/350
[58] Field of Search ............ 359/40, 41, 48, 359/49, 630, 631, 13, 83; 345/7, 8, 102; 362/23, 29, 268, 293, 296, 308, 341, 347, 350; 313/113; 353/31, 98, 119, 122, 99, 102; 361/681

[56] References Cited

U.S. PATENT DOCUMENTS

| 2,387,038 | 10/1945 | Owens | 313/113 |
| 3,887,273 | 6/1975 | Griffiths | 353/98 |
| 4,812,034 | 3/1989 | Mochizuki et al. | 353/122 |
| 4,985,816 | 1/1991 | Seko et al. | 362/293 |
| 4,994,946 | 2/1991 | NakaMats | 362/282 |
| 5,013,135 | 5/1991 | Yamamura | 359/630 |
| 5,150,257 | 9/1992 | Mohabbatizadeh et al. | 359/39 |
| 5,291,184 | 3/1994 | Iino | 345/7 |
| 5,309,340 | 5/1994 | Shigeta et al. | 362/299 |
| 5,412,492 | 5/1995 | Zammit et al. | 359/48 |
| 5,450,221 | 9/1995 | Owen et al. | 362/222 |
| 5,459,539 | 10/1995 | Yamamoto | 353/119 |

FOREIGN PATENT DOCUMENTS

| 193401 | 9/1986 | European Pat. Off. . |
| 3314693 | 10/1984 | Germany . |
| 62-67842 | 4/1987 | Japan . |
| 2195643 | 8/1990 | Japan . |
| 528735 | 4/1993 | Japan . |
| 6183285 | 7/1994 | Japan . |
| 388881 | 6/1965 | Switzerland | 362/308 |
| 2222892 | 3/1990 | United Kingdom . |

OTHER PUBLICATIONS

Patent Abstract of Japan, vol. 17 No. 521 (E-1435) Sep. 1993 re JP-A 05-137039.

*Primary Examiner*—Anita Pellman Gross
*Assistant Examiner*—Walter J. Malinowski
*Attorney, Agent, or Firm*—Cushman, Darby & Cushman

[57] ABSTRACT

A liquid crystal displaying device uses an inexpensive incandescent lamp or xenon lamp without sacrificing luminous intensity of a reflector, while maintaining an ease of installation. In the displaying device, a liquid crystal displaying panel, an incandescent lamp, a reflector, a lens and a heat-ray absorbing filter have a common optical axis and are secured to a bracket. The lamp is held by a socket and installed on the bracket transversely to the optical axis of the reflecting surface of the reflector. Further, the liquid crystal displaying panel has polarizing plates on both sides thereof. A coating to diffuse light from the lamp is disposed on one of the polarizing plates on the light incident side of the displaying panel. The polarizing direction of the polarizing plate on the other side of the displaying panel is selected so that the polarizing direction of the incident light waves on a reflective layer which is disposed on the front windshield glass provides a transversal or horizontal wave.

17 Claims, 7 Drawing Sheets

LCD, LIGHT SOURCE, AND HEMISPHERIC CONCAVE REFLECTOR MOUNTED INDIVIDUALLY TO A SUPPORT AND PART OF A HEADS UP DISPLAY

CROSS REFERENCE TO RELATED APPLICATION

The present application is based on and claims priority from Japanese Patent Applications Nos. Hei 6-61764, Hei 6-126619, and Hei 6-178778 respectively filed on Mar. 30, 1994, Jun. 8, 1994 and Jul. 29, 1994, the contents of which are incorporated herein by reference.

BACKGROUND OF THE INVENTION

1. Field of the Invention

The present invention relates to a liquid crystal displaying device for displaying vehicle information such as vehicle speed, engine rotational speed and the like by projecting an image light from a liquid crystal panel.

2. Description of Related Art

Figure 18:
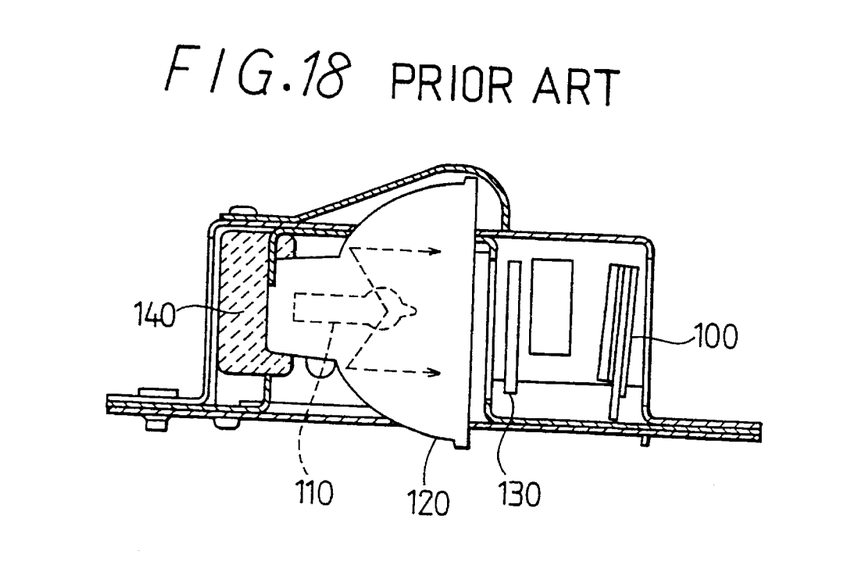
FIG. 18 is a cross-sectional side view illustrating a conventional liquid crystal displaying device.

In a conventional liquid crystal displaying device as shown in FIG. 18, a small-sized bulb 110 such as a halogen lamp, metal halide lamp or the like is used as a light source of a liquid crystal displaying panel 100. In the conventional device, the bulb 110 is inserted into a reflector 120 from the back side of the same. The light radiated from the bulb 110 is reflected from the reflector 120 and become a parallel light, which is diffused by a diffusion panel 130 and transmitted to the liquid crystal displaying panel 100.

However, a small-sized light bulb 110 such as the halogen lamp or metal halide lamp is expensive. On the other hand, an inexpensive bulb such as an incandescent lamp or a xenon (Xe) lamp is much larger in size, and it is impossible to insert the bulb from the back side of reflector 120 in the conventional structure without necessarily sacrificing the function of the reflector 120.

It has been considered that a large-sized bulb may be inserted from the front side of the reflector 120, however it would take much more installation time than the bulb inserted from the rear side of the reflector.

SUMMARY OF THE INVENTION

The present invention is made in view of the foregoing problems and has a main object of providing a liquid crystal displaying device using a large size light bulb such as an inexpensive incandescent lamp or xenon lamp without sacrificing the function of the reflector and without increasing the installation time.

Another object of the present invention is to provide a liquid crystal displaying device in which a light source is installed transversely to the optical axis of the reflector.

Another object of the present invention is to provide a liquid crystal displaying device in which a temperature rise of the liquid crystal displaying panel due to heat from the light source is prevented.

A further object of the present invention is to provide a liquid crystal displaying device in which the uniformity of illumination is improved.

A still further object of the present invention is to provide a liquid crystal displaying device in which the light reflected by the reflector is more effectively used and in which an information image projected from the liquid crystal displaying device is brighter and clearer.

BRIEF DESCRIPTION OF THE DRAWINGS

Other objects, features, and characteristics of the present invention as well as the functions of related parts of the present invention will become clear from a study of the following detailed description, the appended claims and the drawings. In the drawings:

DETAILED DESCRIPTION OF THE PREFERRED EMBODIMENT

A first embodiment according to the present invention is described as below, referring to FIGS. 1 through 7.

Figure 3:
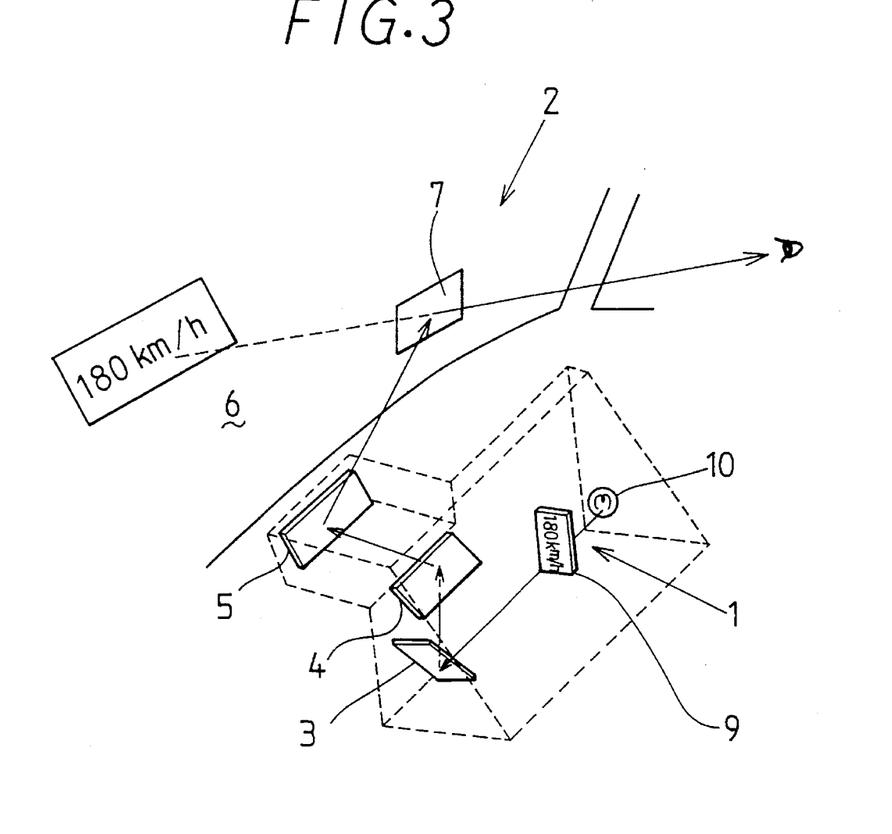
FIG. 3 is a perspective view illustrating a head-up displaying system according to the present invention.

A liquid crystal displaying device 1 in this embodiment is used for a head-up displaying system 2 for a vehicle as illustrated in FIG. 3. This head-up displaying system 2 is installed, for example, into a rear side of an instrument panel. A vehicle information image light is projected from the liquid crystal displaying device 1, is reflected by mirrors 3 and 4 and a hologram 5, and is projected on a reflective layer 7 disposed at an appropriate position of a windshield glass 6 close to a driver's seat (not shown).

Figure 1:
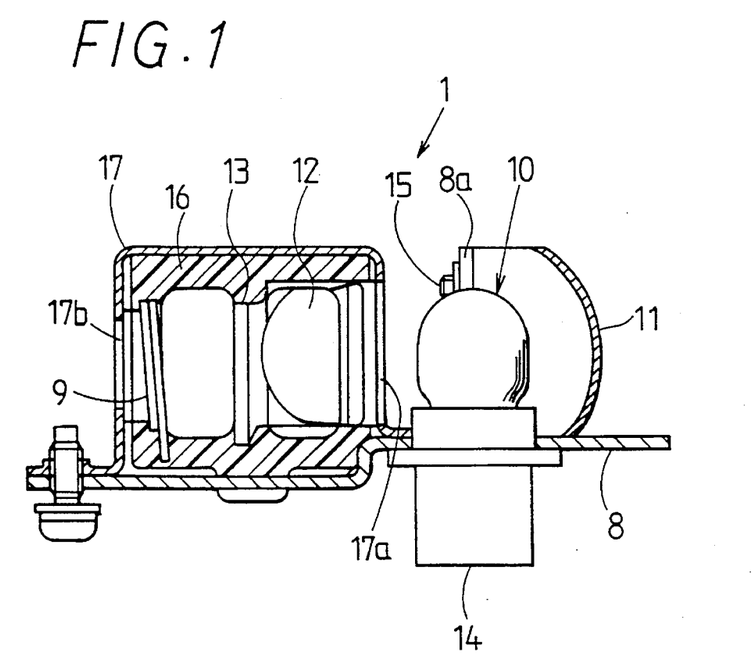
FIG. 1 is a cross-sectional side view illustrating the liquid crystal displaying device according to a first embodiment of the present invention.
Figure 2:
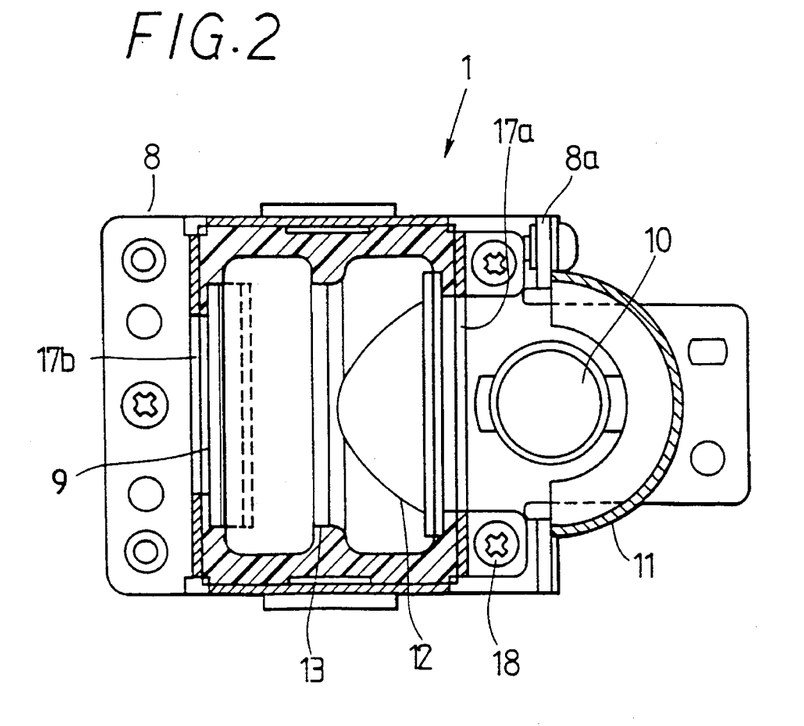
FIG. 2 is a cross-sectional plan view illustrating the liquid crystal displaying device according to the first embodiment.

As shown in FIGS. 1 and 2, the liquid crystal displaying device 1 consists of a bracket 8 which is fixed to a portion of the vehicle, a liquid crystal displaying panel 9, an incandescent lamp 10, a reflector 11, a lens 12 and a heat-ray absorbing filter 13, which are fixed to the bracket 8 along a common optical axis.

The bracket 8 has an opening to receive the lamp 10 therein and a pair of up-standing stays 8a on both sides of the opening to support the reflector 11.

The liquid crystal displaying panel 9 forms an image according to control signals sent from a image control device (not shown).

Figure 4:
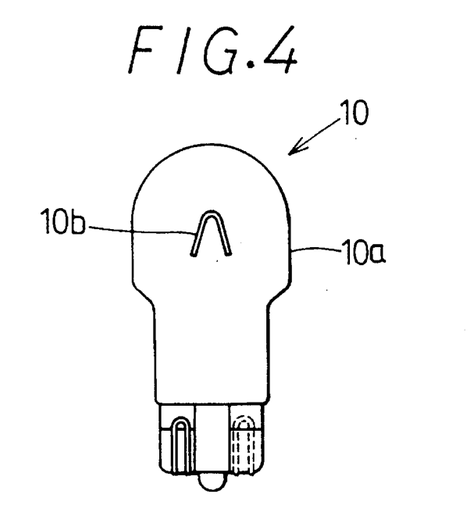
FIG. 4 is a front view illustrating a light bulb used in the preferred embodiments of the present invention and its filament.

The incandescent lamp 10 is received in the opening by a socket 14 which is fixed to the bracket 8 between the displaying panel 9 and the reflector 11 and radiates visible light toward liquid crystal displaying panel 9. As indicated in FIG. 4, the incandescent lamp 10 includes a filament 10b as a luminous body inside a bulb 10a and a light diffusion treatment such as coating of high light-diffusive white powder of silica and frosting of the inner glass surface of the bulb 10a. Therefore, the bulb 10a shines as a whole equally and the luminance uniformity of the surface of bulb 10a is ensured.

The reflector 11 is located at a side of the lamp 10 opposite the liquid crystal displaying panel 9, and is fixed to the stays 8a of the bracket 8 with screws 15. The reflector 11 has a hemispheric surface and a reflective layer on its concave surface formed by a vaporization of high-reflectivity metal such as aluminum. At the top and bottom portions of the reflector, there are formed semicircular openings as shown in FIGS. 1 and 2. The reflector 11 reflects the radiated light from the lamp 10 toward the liquid crystal displaying panel 9.

The lens 12 is disposed between the liquid crystal displaying panel 9 and the lamp 10 to diverge the visible rays from the lamp 9 and reflector 11 to cover the whole area of the liquid crystal displaying panel 9. The lens 12 has a parabolic surface (aspheric surface) on a side facing the liquid crystal displaying panel 9, however, it may have another parabolic surface on the other side as well.

The heat-ray absorbing filter 13 is disposed between the lens 12 and the liquid crystal displaying panel 9 to interrupt or absorb the infrared radiation transmitted through the lens 12 and to prevent a temperature rise of the liquid crystal displaying panel 9.

The aforementioned liquid crystal displaying panel 9, the lens 12 and the heat-ray absorbing filter 13 are fixed to a spacer 16 formed of silicon rubber or the like, and they are installed integrally with a cover 17. The visible light radiated from the lamp 10 and reflected by the reflector 11 passes through an opening 17a formed in the cover 17, the heat-ray absorbing filter 13, the crystal displaying panel 9 and an opening 17b formed in the cover 17.

The socket 14 is inserted into the bracket 8 within the lower semicircular opening of the reflector 11 from an outer circumference of the reflector 11. In other words, the incandescent lamp 10 is installed from below in a direction orthogonal to the common optical axis which is indicated by the dotted line in FIG. 1. It is noted that the upper semicircular opening of the reflector 11 is effective to ventilate and cool the space around the lamp 10.

The operation of the liquid crystal displaying device 1 according to the first embodiment of the present invention is explained next.

The visible light emitted by the incandescent lamp 10 and reflected by the reflector 11 is diverged by the lens 12 to cover the whole area of the liquid crystal displaying panel 9, passes through the heat-ray absorbing filter 13 which absorbs the infrared rays included in the light, and passes through the liquid crystal displaying panel 9. Since the liquid crystal displaying panel 9 forms an image of vehicle information controlled by an image control device, the visible light forms an image illuminating light, which is projected to an appropriate position on the windshield glass 6.

Figure 5:
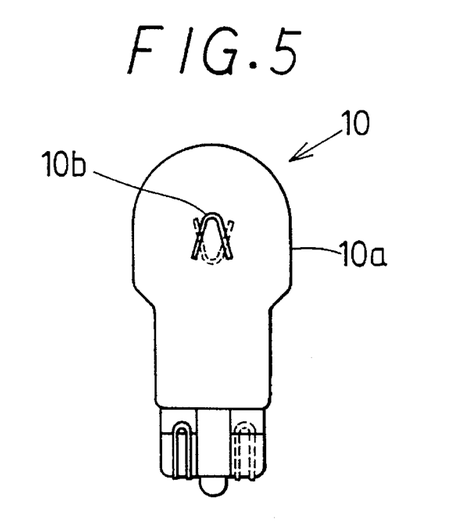
FIG. 5 is a front view illustrating the light bulb, its filament and a virtual image of the filament focussed by the reflector.

Since the reflective surface of reflector 11 has a hemispheric or elliptic shape, the light of filament 10b in the plane of the filament reflected by the reflector 11 becomes a virtual image which is the reversal of the real filament as indicated by the broken line of FIG. 5. Therefore, the uniformity of illumination at the surface of the displaying panel is ensured.

Figure 6:
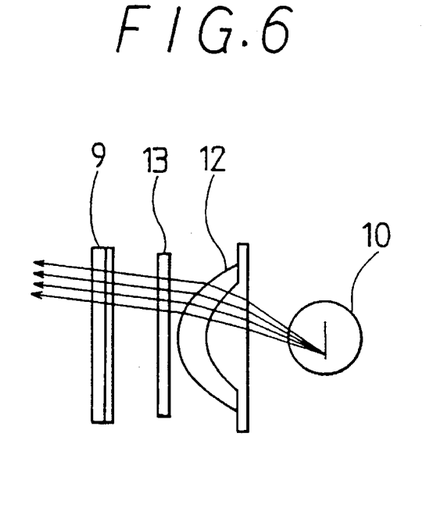
FIG. 6 is a schematic view illustrating a luminous area on a liquid crystal displaying panel covered by a light emitted by the end portion of the filament.
Figure 7:
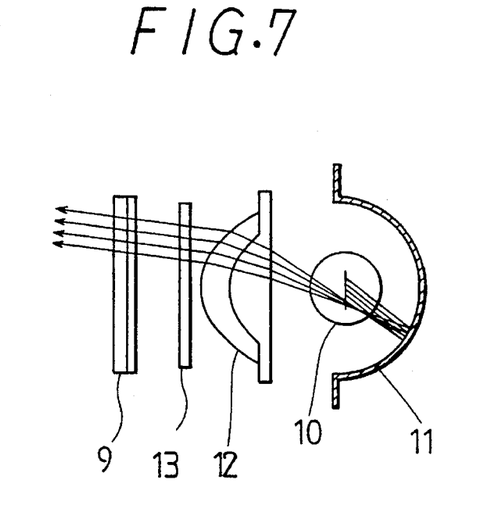
FIG. 7 is a schematic view illustrating a luminous area on a liquid crystal displaying panel covered by light reflected from the central potion of the filament.

When a driver changes his viewing angle, the direct light of an end portion of the filament 10b which is darker than other portions thereof may be utilized depending on the driver's position due to refractive characteristics of the lens 12 as shown in FIG. 6. However, it is eliminated by positioning the reflector 11 so that the light of the center portion of the filament is reflected by the reflector 11 to cover the same area of the liquid crystal displaying panel 9 as the direct light covers as shown in FIG. 7.

Therefore, when an incandescent lamp 10 with a large bulb is used in this embodiment, there is no need to cut reflector 11 to the extent that the luminous intensity of the reflected light of the reflector 11 drops.

Figure 8:
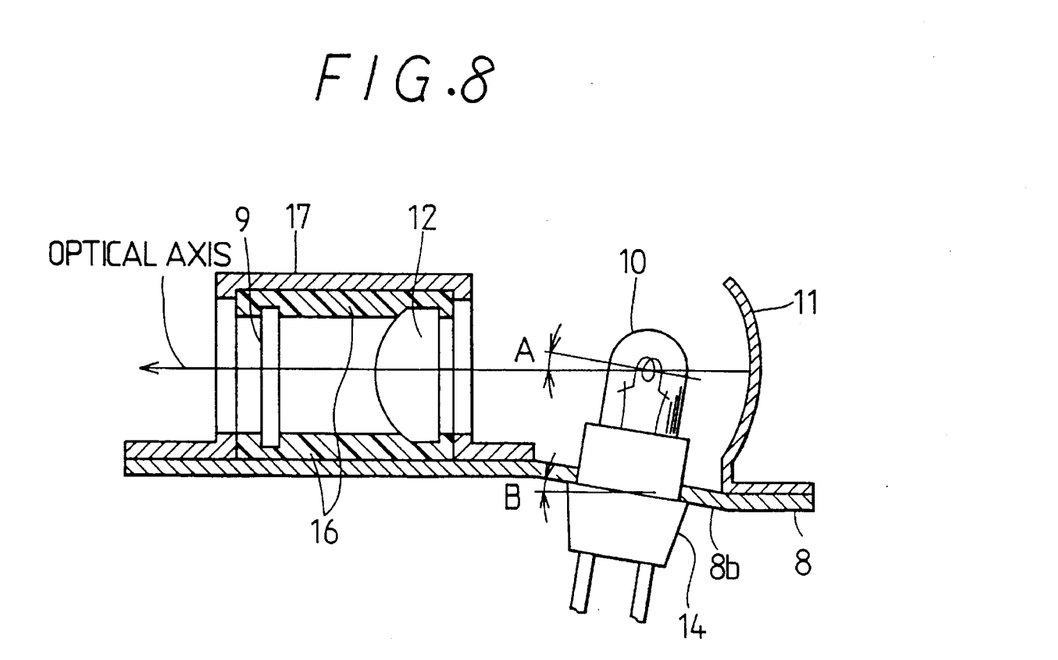
FIG. 8 is a cross-sectional side view of the liquid crystal displaying device according to a second embodiment of the present invention.

A liquid crystal displaying device according to a second embodiment of the present invention is explained next with reference to FIG. 8.

An incandescent lamp 10 is fixed to a bracket to have an installation angle A relative to the optical axis of the displaying device. That is, an installation surface 8b of the bracket 8 on which the socket 14 is fixed is inclined by an angle B (A=B) relative to the optical axis, and, therefore, the bulb of the incandescent lamp 10 is inclined to the side of the reflector 11.

The installation angle A of the lamp 10 to the optical axis is set based on the light distribution characteristics of the lamp 10.

Figure 9:
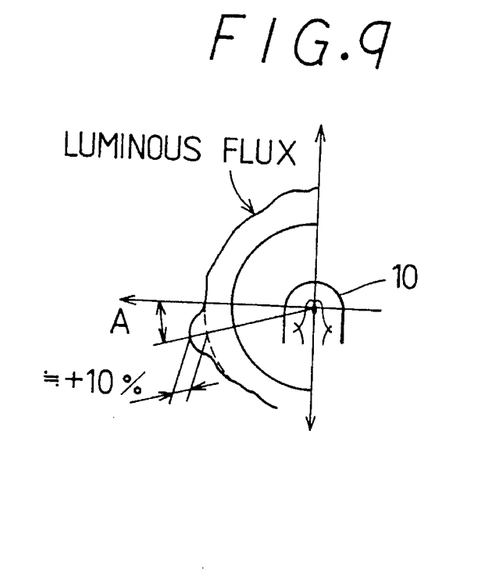
FIG. 9 is a diagrammatic view illustrating the light distribution characteristics of an incandescent lamp.
Figure 10:
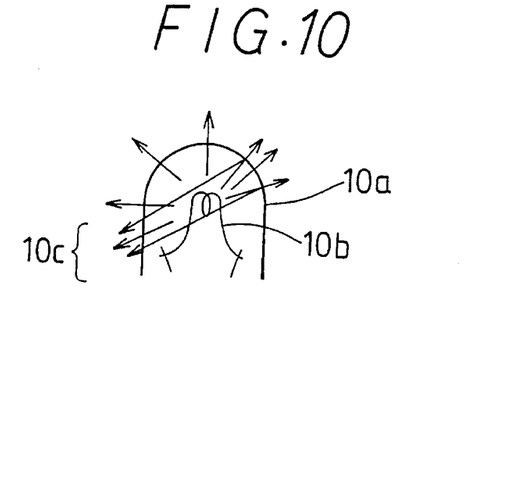
FIG. 10 is a diagrammatic front view of an incandescent lamp illustrating dispersion of the light distribution characteristics.

As is illustrated in FIG. 9, the light distribution characteristics of lamp 10 are not equal around the lamp 10, and the luminous flux may be increased by around 10% in a particular direction. Since the top portion of bulb 10a accommodating filament 10b is hemispheric in shape, a portion of the light radiated by filament 10b is reflected inside bulb 10a at the hemispheric portion as indicated in FIG. 10. On the other hand, in a portion 10c the light reflected by the top portion of the bulb is transmitted through bulb 10a, as indicated in FIG. 10.

In this embodiment, the inclination angle A is selected so that the lump has the maximum luminous flux density in a direction along the display's optical axis. Therefore, it is possible to obtain the information image projected on the reflective layer 7 (shown in FIG. 7) without increasing the size of the incandescent lamp 10. Thus, it is possible to display vehicle information at a required luminance (e.g., several thousand $cd/m^2$) without reducing the durability of the incandescent lamp 10.

Figure 11:
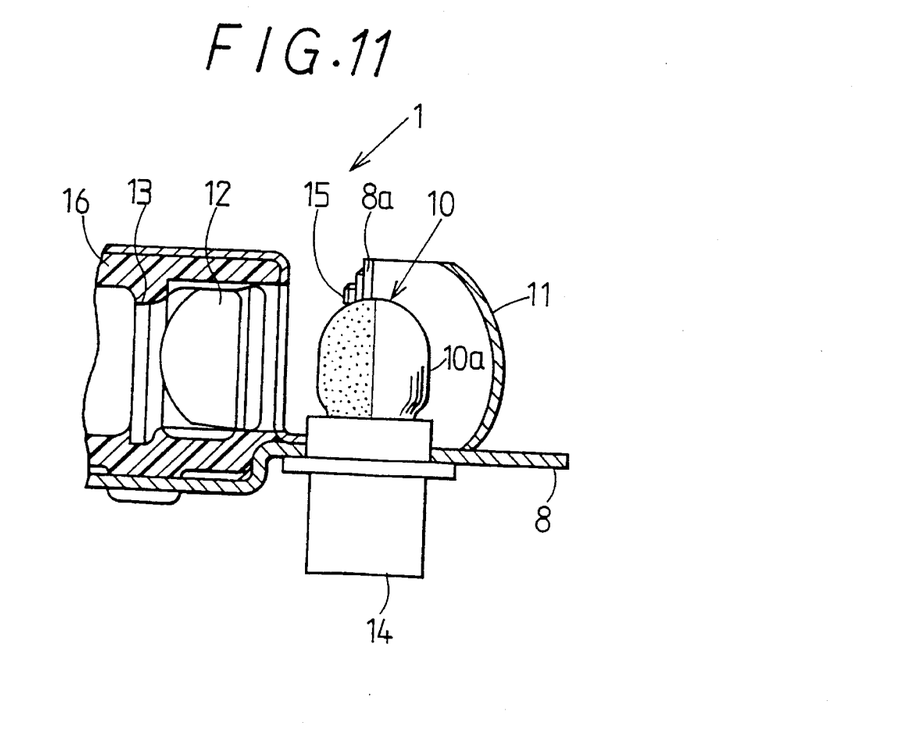
FIG. 11 is a cross-sectional side view illustrating a light bulb according to a third embodiment of the present invention.

A liquid crystal displaying device according to a third embodiment of the present invention is described below, referring to FIG. 11, in which the same reference numerals are substantially the same as described in the previous embodiments and, therefore, the description thereof is omitted except for portions of the device deferent from previously described embodiments.

Incidentally, the description of the other embodiments to follow will be made in the same manner as this embodiment.

In this third embodiment, a diffusion treatment is applied only on a side of the bulb 10a facing the lens 12, while leaving the other side of the bulb 10a transparent. In this case, the light transmitted through the bulb 10a at the side of reflector 11 of lamp 10 is reflected by reflector 11 and is effectively utilized for illumination.

Also, a heat-reflective filter which reflects heat rays may be used in this embodiment instead of heat-ray absorbing filter 13.

Figure 13:
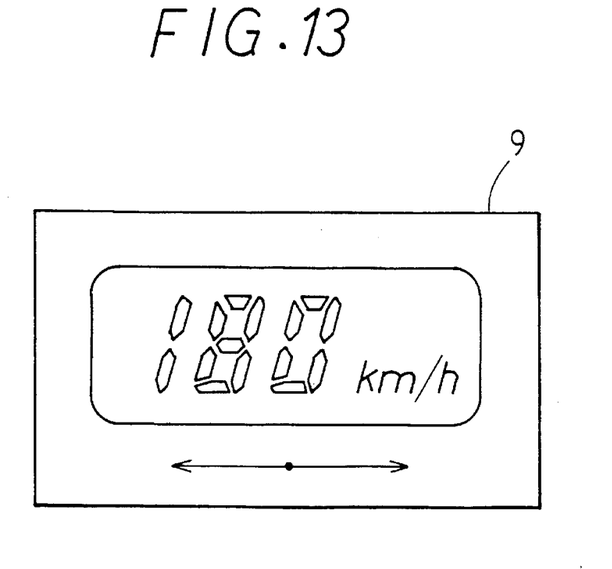
FIG. 13 is a front view illustrating a liquid crystal displaying panel according to the present invention.
Figure 14:
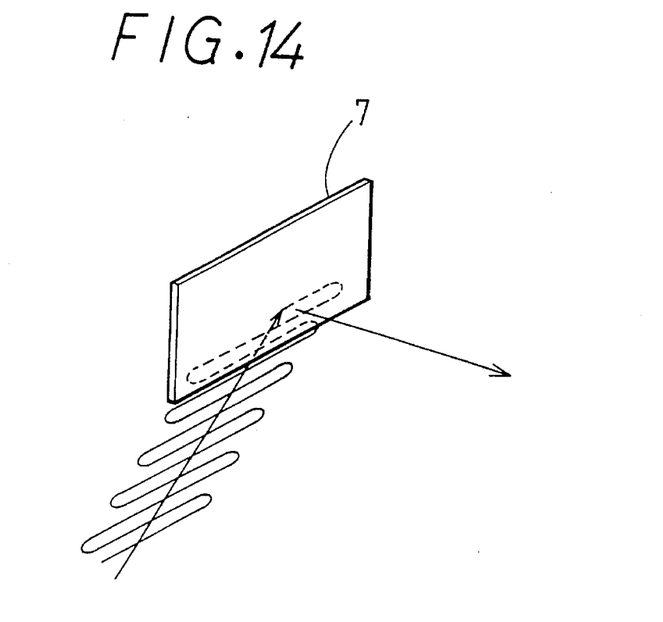
FIG. 14 is a perspective view illustrating a reflective layer and polarizing elements of a transversal light wave.

A liquid crystal displaying device according to a fourth embodiment of the present invention is explained next, referring to FIGS. 12, 13 and 14.

Figure 12:
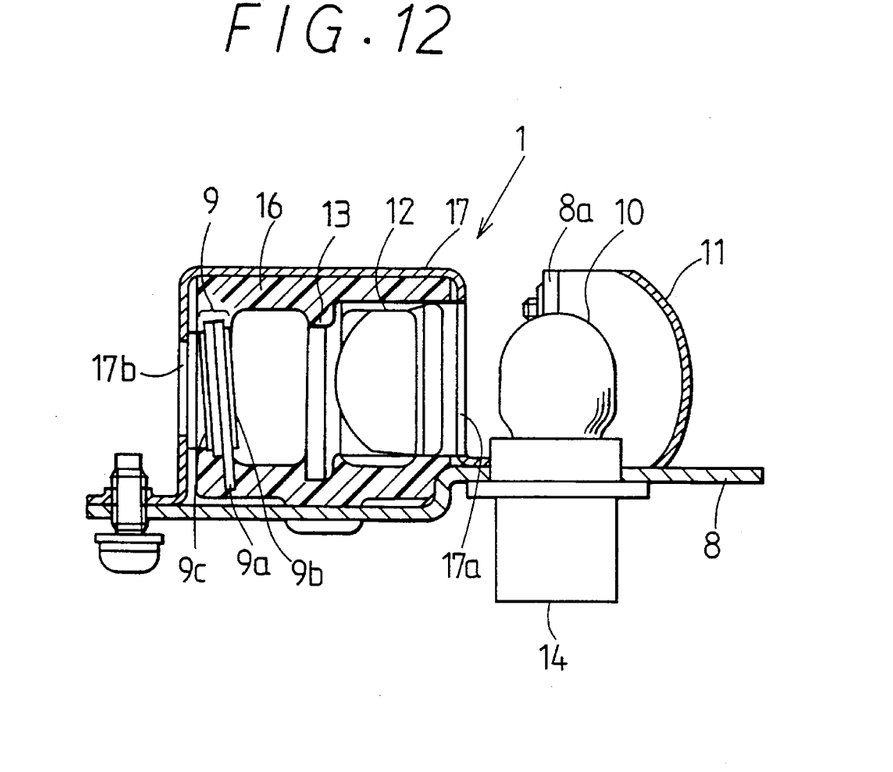
FIG. 12 is a cross-sectional side view illustrating a liquid crystal displaying device according to a fourth embodiment of the present invention.

A liquid crystal displaying panel 9 consists of a liquid crystal cell 9a and a pair of polarizing plates 9b and 9c as shown in FIG. 12.

Polarizing plates 9b and 9c are disposed on both sides of liquid crystal cell 9a and each passes light having a specified polarization direction. A diffusion treatment or an anti-glare treatment is applied to the polarizing plate 8b disposed on the side of incoming or incident light. The polarizing direction of the polarizing plate 9c is arranged so that the light incident on the reflective layer 7 (shown in FIG. 7) becomes a transversal or horizontal wave (an oscillating direction of the polarizing light elements is horizontal as indicated by arrows in FIG. 13). The transversal wave incident on the reflective layer 7 is also illustrated in FIG. 14.

In this embodiment, there is no need to providing a diffusion plate or frost glass or another additional element to secure the luminance uniformity. As a result, downsizing of the axial dimensions of the device is realized, its installation is carried easily, and a cost reduction is achieved.

Figure 15:
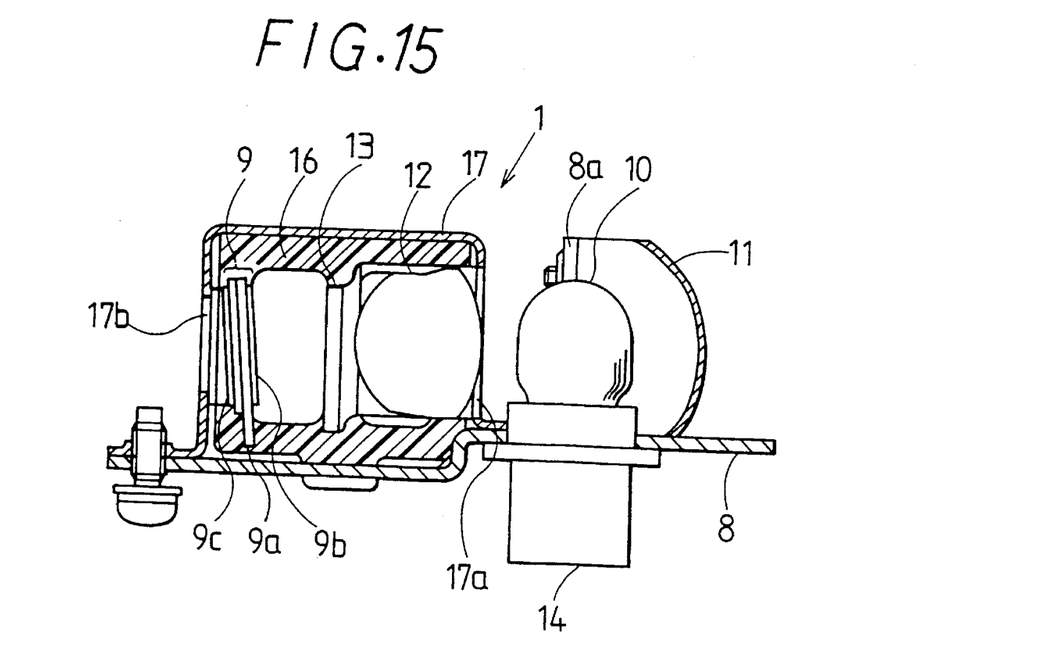
FIG. 15 is a cross-sectional side view illustrating a liquid crystal displaying device according to a fifth embodiment of the present invention.
Figure 16:
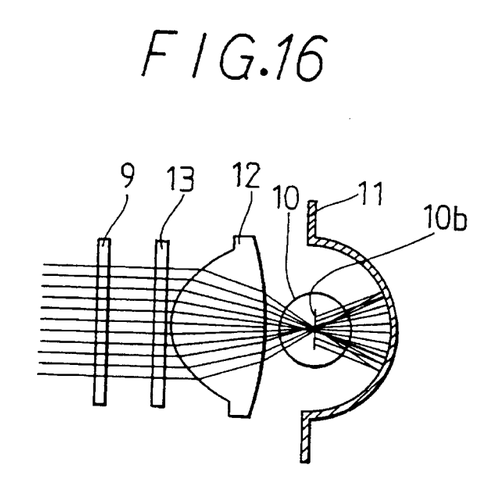
FIGS. 16 and 17 are schematic views illustrating an optical path of lights in the liquid crystal displaying device of the fifth embodiment.
Figure 17:
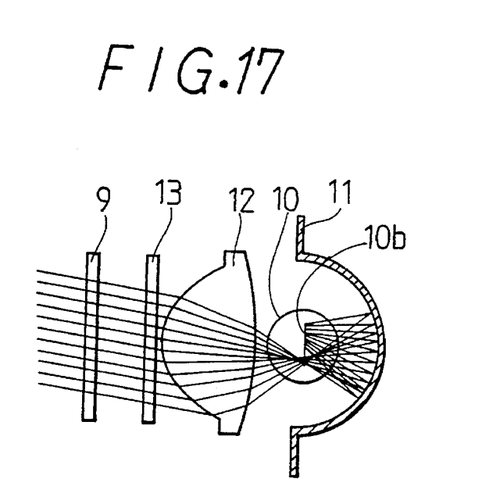

A liquid crystal displaying device according to a fifth embodiment of the present invention is explained next with reference to FIGS. 15, 16 and 17.

In the liquid crystal displaying device of this embodiment, a lens 12 has convex-shaped surfaces on both sides. Therefore, all the light coming from the filament 10b and the reflector 11 passes through the liquid crystal displaying panel 9. That is, when viewed at the center of the view field of the image projected from the liquid crystal panel (i.e., viewed from directly in front of the panel), all the light coming from the reflector 11 and the filament 10b of lamp 10 is used, thereby resulting in no dispersion of the luminance of the image as shown in FIG. 16. Even when the field of the driver's view is shifted from the center of the viewing field to a transversal position, there is no dispersion of the luminance since all the light is utilized for image projection as shown in FIG. 17.

The liquid crystal displaying device 1 of the fifth embodiment may be used in an application other than a head-up display type liquid crystal displaying device.

In the foregoing discussion of the present invention, the invention has been described with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than a restrictive, sense.

What is claimed is:

1. A liquid crystal displaying device comprising:

a base member having an opening;

a liquid crystal displaying panel having an optical axis secured to said base member;

a light source member, secured to said base member within said opening, having a light bulb transversely passing through said base member; and a reflector having a hemispheric concave reflecting surface secured to said base member, said reflecting surface having an optical axis aligned with said optical axis of said liquid crystal displaying panel and being disposed to face said light bulb at a distance from said light bulb opposite said liquid crystal displaying panel, said distance being set so that said concave reflecting surface receives said bulb without sacrificing reflecting function of said reflecting surface.

2. A liquid crystal displaying device according to claim 1, wherein:

said bulb comprises a filament, and said distance is set so that said reflector focuses a virtual reversal image of said filament in a plane containing said filament.

3. A liquid crystal displaying device according to claim 2, wherein said light bulb has a maximum light radiating axis aligned with said optical axis of said lens to provide a maximum luminous image.

4. A liquid crystal displaying device according to claim 3, wherein:

said bulb comprises a incandescent lamp which has said maximum light radiating axis disposed at an inclination to a horizontal axis of said bulb, and said bulb is secured to said base member at said inclination to said optical axis of said lens.

5. A liquid crystal displaying device according to claim 1, wherein said reflector has a semicircular opening, disposed at a portion corresponding to said opening of said base member, for receiving said bulb.

6. A liquid crystal displaying device according to claim 5, wherein said reflector has another opening disposed at a portion of said reflector opposite to said semicircular opening.

7. A liquid crystal displaying device according to claim 1, wherein said base member comprises a stay member extending therefrom for securing said reflector.

8. A liquid crystal displaying device according to claim 1 comprising a lens, which has an optical axis aligned with said optical axis of said reflecting surface and which is disposed between said bulb and said liquid crystal displaying panel, for diverging light incoming thereto to cover an area of said liquid crystal displaying panel.

9. A liquid crystal displaying device according to claim 8, wherein said bulb has a maximum light radiating axis aligned with said optical axis of said lens.

10. A liquid crystal displaying device according to claim 8, wherein said lens has convex surfaces on the sides thereof.

11. A liquid crystal displaying device according to claim 1, wherein:

said liquid crystal displaying panel further comprises polarizing panels on sides thereof and one of said polarizing panels has a coating for diffusing said light.

12. A liquid crystal displaying device according to claim 11, wherein another one of said polarizing plates is disposed so that wave elements of said lights become horizontal wave.

13. A liquid crystal displaying device according to claim 1, further comprising a filter for absorbing heat rays, said filter being disposed between said bulb and said liquid crystal displaying panel.

14. A liquid crystal displaying device according to claim 1, said bulb further comprising a coating for diffusing light radiating toward said liquid crystal displaying panel.

15. A liquid crystal displaying device according to claim 14, wherein said coating is disposed at a portion of said bulb facing said liquid crystal displaying panel.

16. A liquid crystal displaying device comprising:

a bracket having a base member with an opening;

a liquid crystal displaying panel secured to said base member of said bracket;

a light source member having a socket, secured to said bracket and disposed in said opening, and a light bulb which is held by said socket and which has a luminous center; and a reflector having a hemispheric concave reflecting surface secured to a stay member, said reflecting surface being disposed to face said light bulb at a distance from said light bulb opposite said liquid crystal displaying panel, said distance being set so that said reflecting surface receives said bulb without sacrificing reflecting function thereof and focuses a virtual reversal image of said luminous center in a plane containing said luminous center.

17. A liquid crystal displaying device for use in a head-up displaying system including a reflective layer disposed within a field of a driver's view, said device comprising:

a liquid crystal displaying panel having an optical axis and generating an image for projecting vehicle information to said reflective layer;

a light source having a luminous center for radiating light to said liquid crystal displaying panel, said luminous center being disposed on said optical axis of said displaying panel;

a lens disposed between said light source and said liquid crystal displaying panel for diverging light incident thereon to cover an area of the liquid crystal displaying panel; and a reflector having a hemispheric concave reflecting surface and a semicircular opening for receiving said light source therein, said reflecting surface being disposed to face said luminous center at a distance from said luminous center opposite said liquid displaying panel, said distance being set so that said reflecting surface receives said light source without sacrificing reflecting function thereof and focuses a virtual reversal image of said luminous center in a plane containing said luminous center.

* * * * *